(12) United States Patent  (10) Patent No.: US 8,589,244 B2
Gudmundsson  (45) Date of Patent: Nov. 19, 2013

(54) INSTANT, ACCURATE, AND EFFICIENT PRODUCT RECOMMENDATIONS TO CLIENT ENDPOINT

(75) Inventor: Agust Kristinn Gudmundsson, Hackettstown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 63 days.

(21) Appl. No.: 13/253,664

(22) Filed: Oct. 5, 2011

(65) Prior Publication Data

US 2013/0091034 A1 Apr. 11, 2013

(51) Int. Cl.
*G06Q 30/00* (2012.01)
(52) U.S. Cl.
USPC .......................................................... 705/26.1
(58) Field of Classification Search
USPC .......................................................... 705/26.1
See application file for complete search history.

(56) References Cited

U.S. PATENT DOCUMENTS

| 7,966,334 B1 | 6/2011 | Bezos et al. |
| 2002/0087390 A1 | 7/2002 | Weathersby et al. |
| 2003/0212651 A1 | 11/2003 | Hosken |
| 2008/0294617 A1 * | 11/2008 | Chakrabarti et al. ............. 707/5 |

* cited by examiner

*Primary Examiner* — Mila Airapetian (57) ABSTRACT

A method of sending a recommendation to a customer's terminal device includes creating pairs of identifiers based on on-line activities of a group of users. Each pair contains a first and second identifier for items acquired and also acquired by a user. The unique pairings of identifiers are tallied to obtain their counts. The counts are then assigned weights so that the highest counted pairs for each first identifier have equal weight. Unique pairings that contain first identifiers in a list of identifiers derived from a customer's on-line activities are extracted with their counts. The unique second identifiers in the extracted pairings are compiled and the weighted counts are summed to form, based on the summed weighted counts, a list of recommendations. The list is then transmitted, from a computer through a communication network to the customer's terminal device, which presents the list as the recommendation to the customer.

22 Claims, 3 Drawing Sheets

INSTANT, ACCURATE, AND EFFICIENT PRODUCT RECOMMENDATIONS TO CLIENT ENDPOINT

TECHNICAL FIELD

The present subject matter relates to technologies for providing a list of recommendations based upon a customer's on-line activities, such as purchase history, in order to entice a customer into making additional purchases.

BACKGROUND

In recent years, communication services have expanded and increased in popularity around the world. Shopping has also evolved with the evolution of telecommunications technologies, and on-line shopping is now commonplace. Although on-line shopping can be for traditional goods or services, on-line shopping from a device is often related to shopping for content for downloading to the device. Examples of content include, without limitation, media, games, messaging, social networks, programs for execution on the terminal devices, and any other applications or information for use on or with a device.

On-line stores for downloadable products traditionally provide the following options to allow a user to discover available items: 1) search by keywords, 2) browse categories such as Games, Business, Lifestyle, Shopping, Travel & Local, etc., or sub-categories such as Top Paid, Top Free, recent arrival, 3) recommendations, based on (a) the store's pick, (b) the user's download history, or (c) context relevance. Products are then listed based on the number of downloads. Similar recommendation options have also been applied to on-line content stores offering various media content and to on-line stores for sale of traditional goods or services.

Prior approaches to provide recommendations included very large undertakings that often utilized vast arrays of systems. Processing large histories produced very complex mathematical matrixes, and often required large main frame computers that utilized enormous amounts of computing power to crunch out results. Such processing was done during down time batch processing, so customer recommendations were created whether or not they were needed to be displayed online. And when lists were presented online they were based on data available during the nightly batch processing and did not represent the most current buying histories, essentially producing stale and inflexible lists.

Hence, a need exists for improved technologies for providing recommendations that efficiently provide a customer with up-to-date recommendations.

SUMMARY

The teachings herein alleviate one or more of the above noted problems by providing improved methods and systems of sending a recommendation to a customer's terminal device.

For example, a disclosed method of sending a recommendation to a customer's terminal device includes creating pairs of identifiers based on on-line activities of a group of users, wherein each pair contains a first identifier for an item acquired by a user and a second identifier for an item also acquired by that user. The entries for unique pairings of identifiers are tallied to obtain respective counts for unique pairings of identifiers. Weights are assigned to the counts such that the highest counted pairs for each first identifier have equal weight, and for each first identifier each pair having a successively lower count has a successively lower weight. Unique pairings that contain first identifiers present in a list of identifiers derived from a customer's on-line activities are extracted along with the respective weighted counts for the extracted pairings. The unique second identifiers in the extracted unique pairings are compiled and the weighted counts of each instance of a unique second identifier from the extracted unique pairings are summed to form a recommendations list based at least in part on the respective summed weighted counts. A message containing information derived from the identifiers in the recommendations list is transmitted, from a computer through a communication network to the customer's terminal device, to enable the terminal device to present the information as the recommendation to the customer.

An example of a disclosed system includes a user history database that contains identifiers based on on-line activities of a group of users. A customer history record provides a list of identifiers derived from a customer's on-line activities. The system also includes a computer system with access to the user history database and the customer item table. A storage device accessible by a processor of the computer system stores an executable program that configures the computer system to perform functions for sending a recommendation to a customer's terminal device. The functions include functions to create pairs of identifiers from the identifiers in the user history database. Each pair contains a first identifier for an item acquired by a user and a second identifier for an item also acquired by that user. The functions also include functions to tally entries for unique pairings of identifiers to obtain respective counts for unique pairings of identifiers and assign weights to the counts such that the highest counted pairs for each first identifier have equal weight, and for each first identifier each pair having a successively lower count has a successively lower weight. The program also configures the computer system to extract unique pairings and their respective weighted counts that contain first identifiers present in the customer history record, compile the unique second identifiers in the extracted unique pairings and sum the weighted counts of each instance of a unique second identifier from the extracted unique pairings, to form a recommendations list based at least in part on the respective summed weighted counts. The computer system transmits a message containing information derived from the identifiers in the recommendations list, from a computer through a communication network to the customer's terminal device, to enable the terminal device to present the information as the recommendation to the customer.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. For instance, while one example uses a customer's purchase history for the list of identifiers derived from a customer's on-line activities, the list of identifiers can be derived from other lists, such as a list of previews viewed, a list of recommended products, a favorites list, or a wish list. Moreover, the list of identifiers need not use identifiers for actual items, and may contain other identifiers to provide, for example, a list of recommended artists based on artist identifiers, a list of recommended albums based on album identifiers, or a list of recommended video games based on video game identifiers. In other instances, well known methods, procedures, components, and/or circuitry have been described at a relatively high-level, without detail, in order to avoid unnecessarily obscuring aspects of the present teachings.

The various methods and systems disclosed herein relate to sending a recommendation to a customer's terminal device. Reference now is made in detail to the examples illustrated in the accompanying drawings and discussed below.

Figure 1:
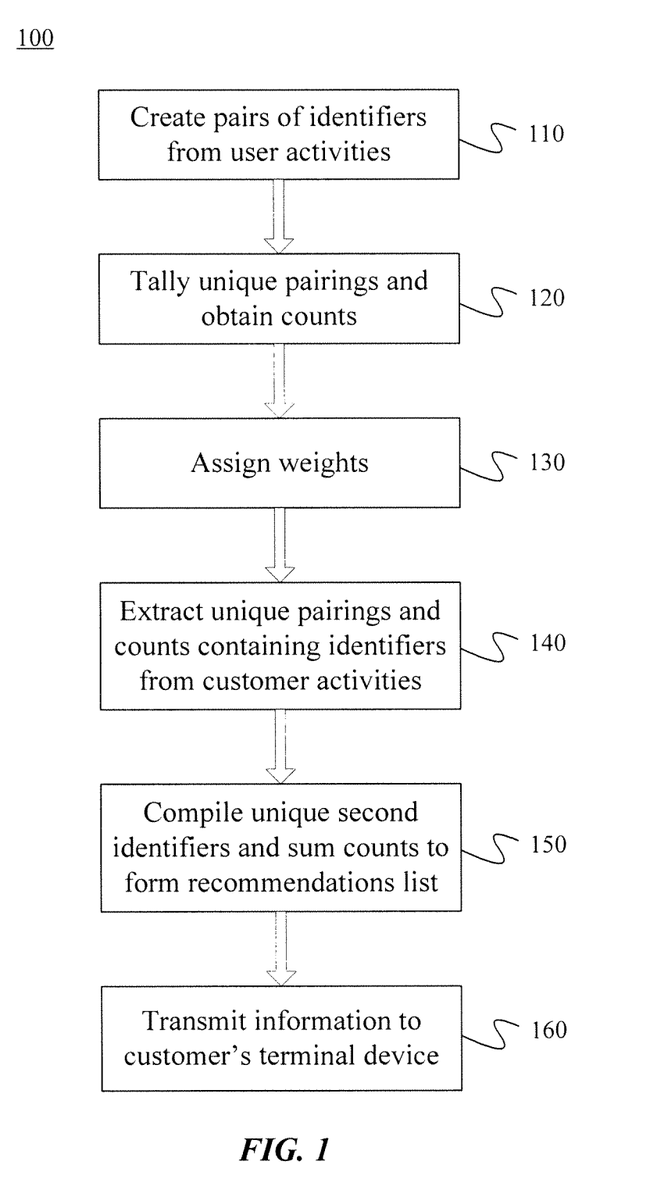
FIG. 1 is a flow chart of a method of sending a recommendation to a customer's terminal device.

As illustrated by way of a simple example in FIG. 1, a method of sending a recommendation to a customer's terminal device 100 includes creating pairs of first and second identifiers from the on-line activities of a group of users (step 110). The group of users can be all users or any subset. However, users whose online activities have only led to one identifier, for example a user who has only made a single purchase if sales activities are used, will have no impact on the recommendations because no pairings will be created from their activities. The unique pairings of identifiers are tallied and counted to obtain counts for each unique pairing (step 120). The method assigns weights to the counts in step 130, to increase the accuracy of the recommendations. Unique pairings that have first identifiers present in a list of identifiers from a customer's activities are extracted, along with their counts, in step 140. The second identifiers are compiled and their counts are summed to form a recommendations list (step 150). A message containing information derived from the identifiers in the recommendations list is then transmitted from a computer through a communication network to the customer's terminal device to enable the terminal device to present the information as the recommendation to the customer (step 160). Steps 100-150 can be carried out ahead of time to prepare reference data, such that step 160 can be done each time a recommendation is called for, using the most recent result of step 150. In addition, step 150 (and then 160) can be carried out in response to customer activity, such as a purchase, using the most recent result of step 140. This allows steps 100-140 to be carried out occasionally (for example, once or twice a week), while still presenting accurate recommendations based on up-to-date data from the customer's activity.

To avoid confusion, the user to whom the information is transmitted is referred to as the customer.

One exemplary method involves the formation of recommendations based on the purchase histories of all users in the group and the purchase history of the customer to whom the recommendations will be sent. Unique pairings are derived and tallied from the purchase histories of all users. The unique pairings are assigned weights. Then, unique pairings are extracted. The unique pairings contain second identifiers, corresponding to recommended items, which also exist in the customer's purchase history. The identifiers for the recommended items are used to form a list of recommended items and are sorted based on the sum of the weighted counts. Identifiers for items already purchased by the customer are not extracted.

In another exemplary method, the number of unique pairings extracted is limited to a certain number for each first identifier.

In a further exemplary method, only a limited number of recent purchases by the customer are used to extract corresponding unique pairings.

In another exemplary method, a customer's purchase history is updated upon a purchase by the customer and the recommendations are updated in response to the purchase.

Figure 2:
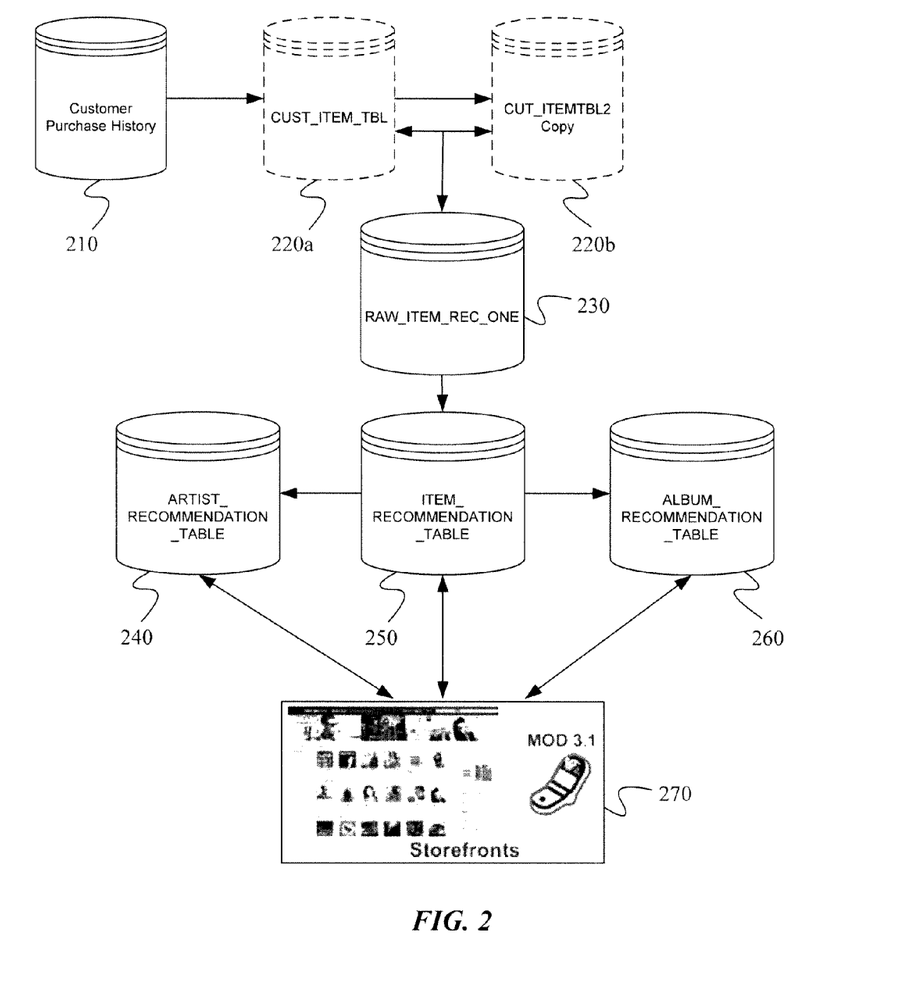
FIG. 2 is a flow chart of an exemplary method of sending a recommendation to a customer's terminal device, based on the purchase histories of customers.

FIG. 2 illustrates an exemplary method for sending recommendations to a customer's terminal device based on the purchase histories of users, possibly including the same user who will receive the recommendation. In our purchase history based example, the identifiers are for items acquired by on-line purchases such as downloadable multimedia content items like music files and/or music related video files; although as noted, the recommendation techniques under consideration also are applicable to identifiers from other on-line user activities, such as viewing previews or adding an item to a wish list. Also, since for this example the on-line activities of the users involve their purchases, we will refer to both the users and the customer to whom the recommendation will be sent as customers in discussing this example.

The various tables 210 to 260 are given labels in the drawings, by way of example only, although other names and name formats may be used. The tables are processed by a computer system, as discussed more with regards to a later system diagram. At various times, the tables are stored in one or more storage devices of appropriate capacity and access speed included in or otherwise accessible to a processor of the computer system that implements the illustrated processing steps.

For the recommendation processing, at least, each customer will be assigned or otherwise have a customer identifier that is unique to the customer in the computer system, at least for purchase history tracking and related processing. For simplicity, the customer number is the letter C followed by a number corresponding to the customer. We will discuss a three user/customer example below. Hence, for our discussions, the three customers are identified by the identifiers C1, C2 and C3.

Each item available for purchase via the on-line service also will have an assigned identifier that is unique to the item in the system. Although other identifier formats may be used, for our simple example, each item is identified by a number. For a simple illustrative example, we will use a purchase history with three customers and seven items available from the service.

Pairs of item identifiers are created from the purchase histories for the user customers, possibly including that of the customer who will receive the recommendation. Customer numbers and product identifiers are extracted from a Customer Purchase History table 210. In order to limit the scope to only items users have actually purchased, an exclusion filter is used to not gather items automatically provided to customers, which can skew results and do not represent choices made by users. Table 1 illustrates the History table 210 with the three customers (C1, C2, C3) and the seven products that they collectively purchased (1-6, 99) for our simple example. The order of the customer identifiers and the item identifiers in this table are given by way of example.

TABLE 1

Customer Purchase History

| Customers | C1 | C2 | C3 |
|---|---|---|---|
| Purchased Items | 1 | 1 | 1 |
| | 2 | 2 | 3 |
| | 3 | 3 | 6 |
| | 4 | 5 | |
| | 99 | 99 | |

As shown in this example, the three customers made thirteen purchases of the items altogether. Although only seven products were offered, several were purchased by more than one customer. In this example, item 99, which is listed as an excluded item, was purchased by 2 customers.

An initial table 220*a* identified as CUST_ITEM_TBL is created with two columns: customer number and item identifiers, for all of the non-excluded items purchased by all of the customers. A record is created for each pairing of identifiers for a customer and an item purchased. For this example, because there were eleven purchases of items, there will be eleven rows in the initial table 220*a*. Table 2 below illustrates the initial table 220*a* using the purchase data from Table 1, for our simple three customer and seven item example. Ascending numerical order of the entries by customer identifier and then by item identifier is shown, for convenience, although the data may be arranged in any order considered to be effective or efficient in subsequent processing steps. Notice that item 99 is not selected and is excluded when creating this table.

TABLE 2

CUST_ITEM_TBL

| Customer Number | Item |
|---|---|
| C1 | 1 |
| C1 | 2 |
| C1 | 3 |
| C1 | 4 |
| C2 | 1 |
| C2 | 2 |
| C2 | 3 |
| C2 | 5 |
| C3 | 1 |
| C3 | 3 |
| C3 | 6 |

The contents of this initial table 220*a* can be copied into a new table CUT_ITEMTBL_2_copy 220*b* to speed up the joining process used in the next step. Making a copy of the table facilitates the processing because a multiprocessing operating system dedicates separate processors to processing the separate copies of the table. This means fewer conflicting requests for memory because the processors are no longer requesting data from the same location. Although making a copy of large data sets appears counter intuitive, in fact it contributes significantly to improving performance.

A table 230, labeled as RAW_ITEM_REC_ONE, is then created to tally the unique pairings of identifiers. Table 2 below illustrates the table 230 populated with the identifiers obtained from the purchase histories of the three customers who collectively purchased the six non-excluded items. In our example, this table includes of two columns, first identifiers corresponding to purchased items and second identifiers corresponding to also purchased items. To show the relationship to the customers, the customer identifiers are shown in the left margin of the table, although the actual data in the table no longer includes the customer identifiers. Again, ascending numerical order of the identifiers is shown for purposes of the example only.

To create this raw item recommendation table 230, a row is created for every combination of items that any customer purchased, along with every item that the customer also purchased. For example, as shown in Table 2, customer C1 purchased items 1, 2, 3, and 4. So, rows are created for the first item purchased "1;" and then in those rows, the item identifier 1 is respectively paired with each of the other items purchased (1-2, 1-3, 1-4). Then the same process is carried out for item 2, which is paired with all of the other items customer C1 purchased (2-1, 2-3, 2-4). When all the rows for customer C1 have been written, the process is carried out for customer C2. This continues until all of the customers have been processed. Table 3 exemplifies how the table would look after the data from Table 2 for our three customers have been processed to create the table 230.

TABLE 3

RAW_ITEM_REC_ONE

| | Purchased Item | Also Purchased |
|---|---|---|
| Customer C1 | 1 | 2 |
| | 1 | 3 |
| | 1 | 4 |
| | 2 | 1 |
| | 2 | 3 |
| | 2 | 4 |
| | 3 | 1 |
| | 3 | 2 |
| | 3 | 4 |
| | 4 | 1 |
| | 4 | 2 |
| | 4 | 3 |
| Customer C2 | 1 | 2 |
| | 1 | 3 |
| | 1 | 5 |
| | 2 | 1 |
| | 2 | 3 |
| | 2 | 5 |
| | 3 | 1 |
| | 3 | 2 |
| | 3 | 5 |
| | 5 | 1 |
| | 5 | 2 |
| | 5 | 3 |
| Customer C3 | 1 | 3 |
| | 1 | 6 |
| | 3 | 1 |
| | 3 | 6 |
| | 6 | 1 |
| | 6 | 3 |

As shown in Table 3, in our simple three user/seven item example, this table tends to get large very quickly. For customer C1 in the above example, twelve rows were created: (1,2), (1,3), (1,4), (2,1), (2,3), (2,4), (3,1), (3,2), (3,4), (4,1), (4,2), and (4,3). For customer C2, there are twelve rows; and for customer C3 there are six rows.

Creating this raw item recommendation table 230 using real product data for many offered items and a meaningfully sized user group can result in billions of rows. For example, 300,000 distinct items purchased by 30 million users can lead to a table with over 20 billion rows. The table 230 also grows even larger as time goes on. However the narrow nature of the table allows for fairly efficient storage in the database.

The numbers of entries for unique pairings are tallied to create an initial Item Recommendation Table, ITEM_REC-OMMENDATION_TABLE 250 with counts for unique pairings of items with other purchased items. This produces a raw unweighted table, for example, containing three columns. Each entry includes: (i) base item, containing the item identifier of the item purchased, (ii) recommended item, containing the item identifier of one of the other item also purchased, and (iii) counts, containing the total number of times this item pair was purchased. Again, ascending numerical order of the identifiers is shown for purposes of the example only.

While the present example uses item identifiers for the actual multimedia contents or application programs purchased, this process can also use other identifiers from the purchase histories, such as artist identifiers or album identifiers, to create an Artist Recommendation Table 240 or Album Recommendation Table 260, respectively.

Duplicate rows are consolidated by using a grouping function. Their count values are tallied in the counts column.

TABLE 4

| Base Item | Recommended Item | Counts |
|---|---|---|
| Item Recommendation Table - Part A | | |
| 1 | 2 | 2 |
| 1 | 3 | 3 |
| 1 | 4 | 1 |
| 1 | 5 | 1 |
| 1 | 6 | 1 |
| 2 | 1 | 2 |
| 2 | 3 | 2 |
| 2 | 4 | 1 |
| 2 | 5 | 1 |
| 3 | 1 | 3 |
| 3 | 2 | 2 |
| Item Recommendation Table - Part B | | |
| 3 | 4 | 1 |
| 3 | 5 | 1 |
| 3 | 6 | 1 |
| 4 | 1 | 1 |
| 4 | 2 | 1 |
| 5 | 1 | 1 |
| 5 | 2 | 1 |
| 5 | 3 | 1 |
| 6 | 1 | 1 |
| 6 | 3 | 1 |

Table 4 represents the initial Item Recommendation Table 250 formed by the tallying and grouping steps if performed on the data for our simple our simple three user/seven item example. Ascending numerical order based on the purchase identifiers is shown for purposes of the example only.

In practice the number of records in the table 250 may number in the tens of millions, and while it provides a pure unweighted ability to recommend items based strictly on a single purchased item, it causes a number of anomalies when recommendations are based on multiple purchases. Consider the below Table 5, which is no longer limited to three customers or seven items. The identifiers for recommended items are not shown in numerical order because additional identifiers were added to the bottom of the customers' lists as they made purchases, but the identifiers can be maintained in any order.

TABLE 5

| Base Item | Recommended Item | Counts |
|---|---|---|
| Item Recommendation Table - Part A | | |
| 1 | 2 | 1000 |
| 1 | 3 | 1400 |
| 1 | 4 | 1500 |
| 1 | 15 | 900 |
| 1 | 6 | 100 |
| 2 | 1 | 1000 |
| 2 | 3 | 300 |
| 2 | 4 | 600 |
| 2 | 6 | 700 |
| 3 | 7 | 450 |
| 3 | 1 | 1400 |
| 3 | 2 | 300 |
| 3 | 6 | 2000 |
| 4 | 6 | 440 |
| Item Recommendation Table - Part B | | |
| ... | ... | ... |
| 6 | 10 | 90,000 |
| 6 | 12 | 100,000 |
| 6 | 11 | 110,000 |
| 6 | 7 | 120,000 |
| 6 | 9 | 130,000 |
| 6 | 2 | 700 |
| 6 | 3 | 2000 |
| 6 | 8 | 60,000 |
| 6 | 4 | 440 |
| 6 | 1 | 100 |
| ... | ... | ... |
| 15 | 1 | 900 |
| ... | ... | ... |

Using exemplary Table 5, the unique pairings and counts that contain base items present in the customer's purchase history are extracted as recommendations. For example, if a customer purchased a single item, the recommendations would be the corresponding items from the recommended items column for the purchased base item. The recommended items would then be ordered by the counts column to form a list of recommended items for transmission to the target user/customer as a recommendation. The actual counts for the items may or may not be included in the recommendation, depending on factors such as the desired size of the recommendation message and what format the service operator thinks will be most effective in encouraging recipients to purchase items based on the recommendation.

Returning to our example, for a customer who purchased only item 1, the recommended items based on the data from Table 5 would be:

TABLE 6

| Recommended Item | Counts |
|---|---|
| 4 | 1500 |
| 3 | 1400 |
| 2 | 1000 |
| 15 | 900 |
| 6 | 100 |

For a customer who purchased multiple items, the recommendations would be all the corresponding items from the recommended items column for the purchased base items. Items already purchased would be removed. Recommendations that appear more than once are compiled and have their counts summed together. Identifiers for items already purchased by the customer are not extracted. For example, for a customer who bought items 1, 3, and 4, the recommended items would be:

TABLE 7

| Recommended Item | Counts |
| --- | --- |
| 6 | 2540 |
| 2 | 1300 |
| 15 | 900 |
| 7 | 450 |

As can be seen, items 1, 3, and 4 were not extracted because they were already purchased, and item 6 moved to the top of the list because it had the largest sum of counts. This table is used to produce recommendations sent to the customer's terminal device 270. But as discussed below, it has a flaw that manifests itself when the data set increases and the diversity of purchase patterns is taken into account.

Table 7 displays the basic concept of basing all recommendations on how many items were purchased, giving a basic window into the popularity of such items. However, it also displays skewed results when there is a large disparity of popularity for various items. Such disparities can occur, when recommending music artists for instance, where popular hip hop and rap artists can have results in the tens of thousands, while country or soft rock would have permutations in the hundreds. If a customer who primarily purchased country songs bought a single cross-over hip hop song, that one item would essentially force a user to see "top ten" recommendations with little impact on their actual favorites. Such a result will always produce a recommendation containing the most popular items with no regard to whether a customer would be interested in them or not. The other factor is that extremely popular items often have thousands of "also purchased" items, when in practice no more than 20-30 are need.

In practice, Table 5 could have several million other items, which were omitted for clarity during the above description. If items 1, 2, 3, and 15 are country songs and items 6, 7, 8, 9, 10, 11, and 12 are popular hip hop songs, the ellipses entries would be several thousand other pairs for various items corresponding to base item 6 with different counts. In addition, the tables would have several million base items besides those shown.

Using the example of the customer who bought items 1, 3 and, 4 above, but also bought item 6, the following recommendations would be produced.

TABLE 8

| Recommended Item | Counts |
| --- | --- |
| 9 | 130,000 |
| 7 | 120,450 |
| 11 | 110,000 |
| 12 | 100,000 |
| 10 | 90,000 |
| 8 | 60,000 |
| ... | ... |
| 2 | 2000 |
| 15 | 900 |

As shown in Table 8, adding item 6 overwhelms the recommendations from items 1, 3, and 4. In practice, the ellipses entry here could include several thousand more entries before finally getting to items 2 and 15. And because only a limited number of the top recommendations are typically shown, items 2 and 15 are unlikely to be shown at all. In fact, even if the customer bought eight more items with counts under 1000 corresponding to the same recommended item, that item would still not crack into the top five positions.

In order to produce a more manageable and stable basis for recommendations, each item is weighted. The weighting logic assigns a fixed value, such as 300 used below, to the most popular recommended item for each base item and then gradually decrements each successively lower count with regard to each successively less popular recommended item for each base item. The weighted counts are no longer actual counts and do not have any proportional relationship to the actual counts, but represent rankings derived from the actual counts. Thus, after the weights are assigned, corresponding pairs, such as (1,3) and (3,1), which had the same unweighted counts, may no longer have the same weighted counts. Applying this weighting process to the count data in our example above, the weighting process produces Table 9.

TABLE 9

| Base Item | Recommended Item | Counts |
| --- | --- | --- |
| Item Recommendation Table - Part A | | |
| 1 | 2 | 280 |
| 1 | 3 | 290 |
| 1 | 4 | 300 |
| 1 | 15 | 270 |
| 1 | 6 | 260 |
| 2 | 1 | 300 |
| 2 | 3 | 270 |
| 2 | 4 | 280 |
| 2 | 6 | 290 |
| 3 | 7 | 280 |
| 3 | 1 | 290 |
| 3 | 2 | 270 |
| 3 | 6 | 300 |
| 4 | 6 | 300 |
| Item Recommendation Table - Part B | | |
| ... | ... | ... |
| 6 | 10 | 260 |
| 6 | 12 | 270 |
| 6 | 11 | 280 |
| 6 | 7 | 290 |
| 6 | 9 | 300 |
| 6 | 2 | 230 |
| 6 | 3 | 240 |
| 6 | 8 | 250 |
| 6 | 4 | 220 |
| 6 | 1 | 210 |
| ... | ... | ... |
| 15 | 1 | 300 |
| ... | ... | ... |

The 300 count value used for the most popular recommended items and the 10 count linear decrement to obtain the successively decreasing counts for successively less popular items, as well as the order shown in the table, are given here by way of example only.

Because of the weighting, the method can extract only a limited number of pairings from the Item Recommendation Table 250 for each item purchased by the customer without dramatically affecting the accuracy of the recommendations. In fact, if weightings are decremented linearly (as in the present example), then there will be only a limited number of non-zero weighted pairings for each base item to be extracted. But the number of pairings extracted can also be limited to a fixed number (such as ten). The extracted table can then be used for recommendations in the following way. If a new customer purchased item numbers 1, 3, and 4, the following rows of pertinent data shown in Table 10 would be extracted from the data in Table 9 above. Table 10 contains the unique pairings of identifiers for base items and recommended items, along with their weighted counts, which contain base items that are in the customer's purchase history, which in this example is item numbers 1, 3, and 4.

TABLE 10

Item Recommendation Table

| Base Item | Recommended Item | Counts |
|---|---|---|
| 1 | 2 | 280 |
| 1 | 3 | 290 |
| 1 | 4 | 300 |
| 1 | 15 | 270 |
| 1 | 6 | 260 |
| 3 | 7 | 280 |
| 3 | 1 | 290 |
| 3 | 2 | 270 |
| 3 | 6 | 300 |
| 4 | 6 | 300 |

It is the recommended items, not the base items, which are used to form the list of recommended items, so Table 10 is sorted by recommended items to allow for compiling that unique recommended items. This results in Table 11:

TABLE 11

Item Recommendation Table

| Base Item | Recommended Item | Counts |
|---|---|---|
| 3 | 1 | 290 |
| 1 | 2 | 280 |
| 3 | 2 | 270 |
| 3 | 3 | 290 |
| 1 | 4 | 300 |
| 1 | 6 | 260 |
| 1 | 6 | 300 |
| 4 | 6 | 300 |
| 3 | 7 | 280 |
| 1 | 15 | 270 |

The identifiers for base items are no longer needed so the base item column is removed. Entries with identifiers for items 1, 3, and 4 in the recommended items column are removed from the table because they were already purchased and do not need to be part of the recommendation. The recommended items are compiled by removing duplicate rows of identifiers for recommended items using a grouping summation function. Their weighted count values are summed, and the table is sorted by counts, leading to the recommended item table below:

TABLE 12

| Recommended Item | Counts |
|---|---|
| 6 | 860 |
| 2 | 550 |
| 7 | 280 |
| 15 | 270 |

Because this table was based on a purchase history of items with relatively similar unweighted counts, the differences between Table 12 and Table 7, from the unweighted search, is minor, with the identifiers for items 7 and 15 in reverse order.

Adding item 6 to the customer's purchase history, however, results in the table below. Table 13, based on a customer purchase history of items 1, 3, 4, and 6 and using weighted counts, differs noticeably from Table 8, which was based on the same purchase history but used unweighted counts.

TABLE 13

| Recommended Item | Counts |
|---|---|
| 2 | 780 |
| 7 | 570 |
| 9 | 300 |
| 11 | 280 |
| 15 | 270 |
| 12 | 270 |
| 10 | 260 |
| 8 | 250 |

As shown above, the weighting allows the identifier for item 2 to remain at the top because it appeared in several pairs and was not overridden by items such as 9 through 8, which only had a single corresponding base item. In addition, because it was paired with both base items 3 and 6, recommended item 7 remains high in the list.

Table 13 is used to form the recommendations list that is used to create the message transmitted to the customer. The recommendations list includes identifiers for a certain number of items with the highest summed weighted counts in Table 13. The counts can be included in the message transmitted to the terminal device to allow it to present the items in order from highest count to lowest count, but the recommendation can be in any order because the items with the highest counts were used to form the recommendations list. The counts can be presented to the customer with the recommendation, either as they exist in Table 13 or used to create a popularity rating to present with the recommendations. The message transmitted to the customer may also include information for other items not in Table 13, such as daily specials or just released items. After repeated experimentation and evaluation of results, it was found that the recommendation from these weighted tables produced much better results.

One of the benefits of weighting is that very popular items such as item 6 in these examples, which would have thousands of corresponding recommended items in an unweighted table, can be limited to a certain number of recommended items. Thus, only a limited number of unique pairs need to be extracted for each identifier in the customer's purchase history to make an effective recommendation list. This causes a weighted table to be only a small fraction of an unweighted table in size, which leads to large performance benefits during searching. And since most recommendations list only a few (such as five to ten) items, over which customers generally pay less attention to, there is virtually no impact on the richness of the recommendation. However, while the corresponding recommended items can be limited to ten items, customers with large purchase histories (for example, more than a thousand items), may have already purchased all the items in the top ten, leaving nothing to recommend. This can be solved by increasing the number of recommended items to a number, such as thirty, statistically unlikely to have been purchased by a single customer. The selection of this statistically unlikely number depends on the balance between computational speed and user experience.

It should be noted that in actual processing the weighted recommendation table can contain over thirty million records, which were derived from the unweighted table that can have over one hundred million records, and which was created by collapsing thirteen to fourteen billion pairs (a row of values in a relational database). These examples were brought to a smaller scale for clarity.

Figure 3:
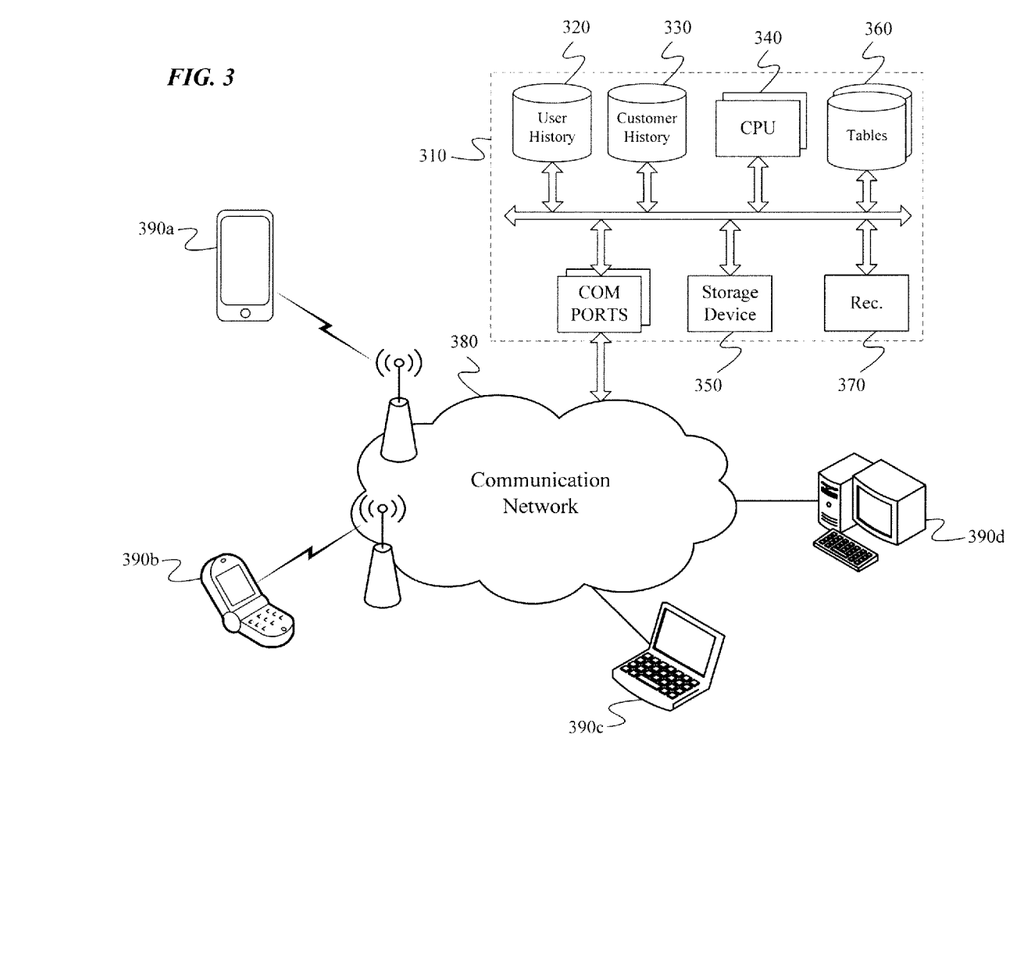
FIG. 3 is a simplified functional block diagram of a system for sending a recommendation to a customer's terminal device through a communication network.

FIG. 3 illustrates a system for sending a recommendation to a customer's terminal device. The computer system 310 includes a user history database 320 with customer identifiers and item identifiers based on on-line activities of a group of users, similar to the table 210 in the earlier example. The system also includes a customer history record 330 with a list of identifiers derived from a target customer's on-line activities. The user history database 320 and customer history record 330 are located in a computer readable storage device. A computer readable storage device can be non-volatile memory, such as flash memory or optical or magnetic disks, or volatile memory, such as dynamic random-access memory (DRAM). The customer history record can be separate from the user history database, as shown for convenience, or the customer history record can be the part of the user history database 320 that corresponds to the target customer, because the customer's on-line activities are part of the on-line activities of a group of users when a user different from the customer is receiving recommendations.

The system also includes CPUs 340 with access to the user history database and the customer history record, and an executable program in a computer readable storage device 350 accessible to a processor of the computer system. Each CPU may be formed of one or more processors. Execution of the program by the processor configures the computer system to perform functions for sending a recommendation to a customer's terminal device. Execution of the programming configures the CPU 340 to generate or transform a series of tables 360 like those discussed above with respect to the process of FIG. 2. For example, an initial table similar to table 230 includes pairs of identifiers, where each pair has a first identifier for an item acquired by a user and a second identifier for an item also acquired by that user. Although shown separated, the tables 360 may be kept in the same storage device as the histories and/or in the storage device 350 that stores the programming.

The functions performed by the computer system include functions to tally the unique pairings of identifiers in the initial table. The numbers of unique pairings tallied are used as corresponding counts for each unique pairing. The counts can be added to the initial table with the pairings grouped into unique pairings or a new table similar to recommendation tables 240, 250, or 260 can be generated with the unique pairings and their corresponding counts. The computer system is also configured to assign weights to the counts by adjusting the count values so that the highest counted pairs for each first identifier have equal weight, and for each first identifier each pair having a successively lower count has a successively lower weight. The system is configured to extract the unique pairings, and their respective weighted counts, that contain first identifiers that are also present in the customer history record, and compile the unique second identifiers in the extracted unique pairings and sum the weighted counts of each instance of a unique second identifier from the extracted unique pairings to form a list of recommendations based at least in part on the respective summed weighted counts. An actual recommendation 370 is developed from the list based on the summed weighted counts, containing information about one or more of the items identified in the list. The recommendation may be developed and stored in a storage device or in main memory (not shown) associated with the computer system. The programming also configures the CPU so that the system will transmit a message containing the actual recommendation, from a computer system through a communication network 380 to the customer's terminal device, to enable the terminal device to present the information as the recommendation to the customer. The terminal device can be any device capable of on-line shopping through a communication network, such as a smart-phone 390a, portable handset 390b, portable computer 390c, or desktop computer 390d.

Normally, the storage devices for the executable program are within the computer system to allow high-speed access, although they may be separate. The storage device(s) for data may be in the computer system itself, may be implemented as locally connected peripheral devices, or may be implemented as remote devices accessed by local or wide area network communications, depending on performance related factors such as the amounts of data being processed, the number of sources and frequency of data input, the number of users of processed data, and the requirements for speed and accuracy of the results to be provided to customers.

For recommendations based on the customer's purchase history, the calculation of recommendations uses an input list of items and produces a list of items to recommend, excluding items already purchased. For customers with large purchase histories, using the full purchase history as the input list can be impractical due to the large exponential factor as the number of items increases. One solution is to limit the input list to only the most recent purchases, although the exclusion list should remain intact. Since the primary benefit of this solution is speed, various techniques can speed up the process.

In one technique, when a customer logs on, a procedure is set in place to create a global temporary table that selects all customer items purchased and the date they were purchased. A limited number of recent purchases (for example, the thirty most recent purchases) are used as the base items for the recommendation table. The list of corresponding items also purchased is then filtered against the entire list of items purchased. The resulting list is grouped by recommended items, and the counts are summed and sorted to create the list of items to recommend to the customer.

The customer's purchase history is updated upon a purchase by the customer. Since the customer purchase history is updated within a few seconds of actual purchase, and because only a limited number of recent purchases are used, information on items to recommend to the customer is generated and transmitted to the customer with significantly less processing time required. Thus, a customer logged into the system will see the items recommended to them change almost immediately after a new purchase. Consequently, the base recommendation table may only be built every few days and are supplemented with the latest customer purchases to produce fresh and reactive recommendations after a purchase is processed.

These steps may be accomplished with a single SQL statement. With current technology, the process can return a recommendation in less than 130 ms. Including all overhead, such as creating a temporary table of purchases, filtering based on preferences, and transport across networks, wall times can average 500 ms when accessed using an application programming interface (API).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of sending a recommendation to a customer's terminal device, comprising the steps of:
    based on on-line activities of a group of users, creating pairs of identifiers, wherein each pair contains a first identifier for an item acquired by a user and a second identifier for an item also acquired by that user;
    tallying entries for unique pairings of identifiers to obtain respective counts for unique pairings of identifiers;
    assigning weights to the counts such that the highest counted pairs for each first identifier have equal weight, and for each first identifier each pair having a successively lower count has a successively lower weight;
    extracting unique pairings and their respective weighted counts that contain first identifiers present in a list of identifiers derived from a customer's on-line activities;
    compiling via a computer the unique second identifiers in the extracted unique pairings and summing the weighted counts of each instance of a unique second identifier from the extracted unique pairings to form a recommendations list based at least in part on the respective summed weighted counts; and
    transmitting a message containing information derived from identifiers in the recommendations list, from the computer through a communication network to the customer's terminal device, to enable the terminal device to present the information as the recommendation to the customer.

2. The method of claim 1, wherein the extracting step extracts only a limited number of unique pairings for each identifier in the list of identifiers derived from the customer's on-line activities.

3. The method of claim 2, wherein the extracting step does not extract unique pairings that contain second identifiers for items already acquired by the customer.

4. The method of claim 1, wherein the list of identifiers derived from the customer's on-line activities contains identifiers for items acquired on-line by the customer.

5. The method of claim 4, wherein the extracting step does not extract unique pairings that contain second identifiers for items already acquired on-line by the customer.

6. The method of claim 1, wherein the list of identifiers derived from the customer's on-line activities contains identifiers for items previewed on-line by the customer.

7. The method of claim 1, wherein the list of identifiers derived from the customer's on-line activities contains a limited number of identifiers for items recently acquired on-line by the customer.

8. The method of claim 7, further comprising the step of:
    updating the list of identifiers derived from the customer's on-line activities upon a purchase by the customer;
    wherein the transmitting occurs in response to the purchase by the customer.

9. The method of claim 1, further comprising the step of:
    updating the list of identifiers derived from the customer's on-line activities upon a purchase by the customer; and wherein:
    the transmitting occurs in response to the purchase by the customer;
    the extracting step extracts only a limited number of unique pairings for each identifier in the list of identifiers derived from the customer's on-line activities; and
    the list of identifiers derived from the customer's on-line activities contains a limited number of identifiers for items recently acquired on-line by the customer.

10. The method of claim 9, wherein the extracting step does not extract unique pairings that contain second identifiers for items already acquired by the customer.

11. The method of claim 1, wherein the weighting step linearly decrements the weight assigned to each pair with successively lower count.

12. A system, comprising:
    a user history database comprising identifiers based on on-line activities of a group of users;
    a customer history record comprising a list of identifiers derived from a customer's on-line activities;
    a computer system having access to the user history database and the customer history record;
    an executable program in a non-transitory storage device accessible to a processor of the computer system, wherein execution of the program by the processor configures the computer system to perform functions for sending a recommendation to a customer's terminal device, the functions including functions to:
    create pairs of identifiers from the identifiers in the user history database, wherein each pair contains a first identifier for an item acquired by a user and a second identifier for an item also acquired by that user;
    tally entries for unique pairings of identifiers to obtain respective counts for unique pairings of identifiers;
    assign weights to the counts such that the highest counted pairs for each first identifier have equal weight, and for each first identifier each pair having a successively lower count has a successively lower weight;
    extract unique pairings and their respective weighted counts that contain first identifiers present in the customer history record;
    compile the unique second identifiers in the extracted unique pairings and summing the weighted counts of each instance of a unique second identifier from the extracted unique pairings to form a recommendations list based at least in part on the respective summed weighted counts; and
    transmit a message containing information derived from the identifiers in the recommendations list, from the computer system through a communication network to the customer's terminal device, to enable the terminal device to present the information as the recommendation to the customer.

13. The system of claim 12, wherein the extract function is configured to extract only a limited number of unique pairings for each identifier in the list of identifiers derived from the customer's on-line activities.

14. The system of claim 13, wherein the extract function is configured to not extract unique pairings that contain second identifiers for items already acquired on-line by the customer.

15. The system of claim 12, wherein the customer history record comprises a list of identifiers for items acquired on-line by the customer.

16. The system of claim 15, wherein the extract function is configured to not extract unique pairings that contain second identifiers for items already acquired on-line by the customer.

17. The system of claim 12, wherein the customer history record comprises a list of identifiers for items previewed on-line by the customer.

18. The system of claim 12, wherein the customer history record comprises a limited number of identifiers for items recently acquired on-line by the customer.

19. The system of claim 18, wherein:
    the executable program configures the computer system to perform a further function to update the customer history record upon a purchase by the customer, and the transmitting function occurs in response to the purchase by the customer.

20. The system of claim 12, wherein:

the extract function is configured to extract only a limited number of unique pairings for each identifier in the list of identifiers derived from the customer's on-line activities;

the customer history record comprises a limited number of identifiers for items recently acquired on-line by the customer;

the executable program configures the computer system to perform a further function to update the customer history record upon a purchase by the customer, and the transmitting function occurs in response to the purchase by the customer.

21. The system of claim 20, wherein the extract function is configured to not extract unique pairings that contain second identifiers for items already acquired on-line by the customer.

22. The system of claim 12, wherein the assign weights function linearly decrements the weight assigned to each pair with successively lower count.

* * * * *